Patented Dec. 16, 1952

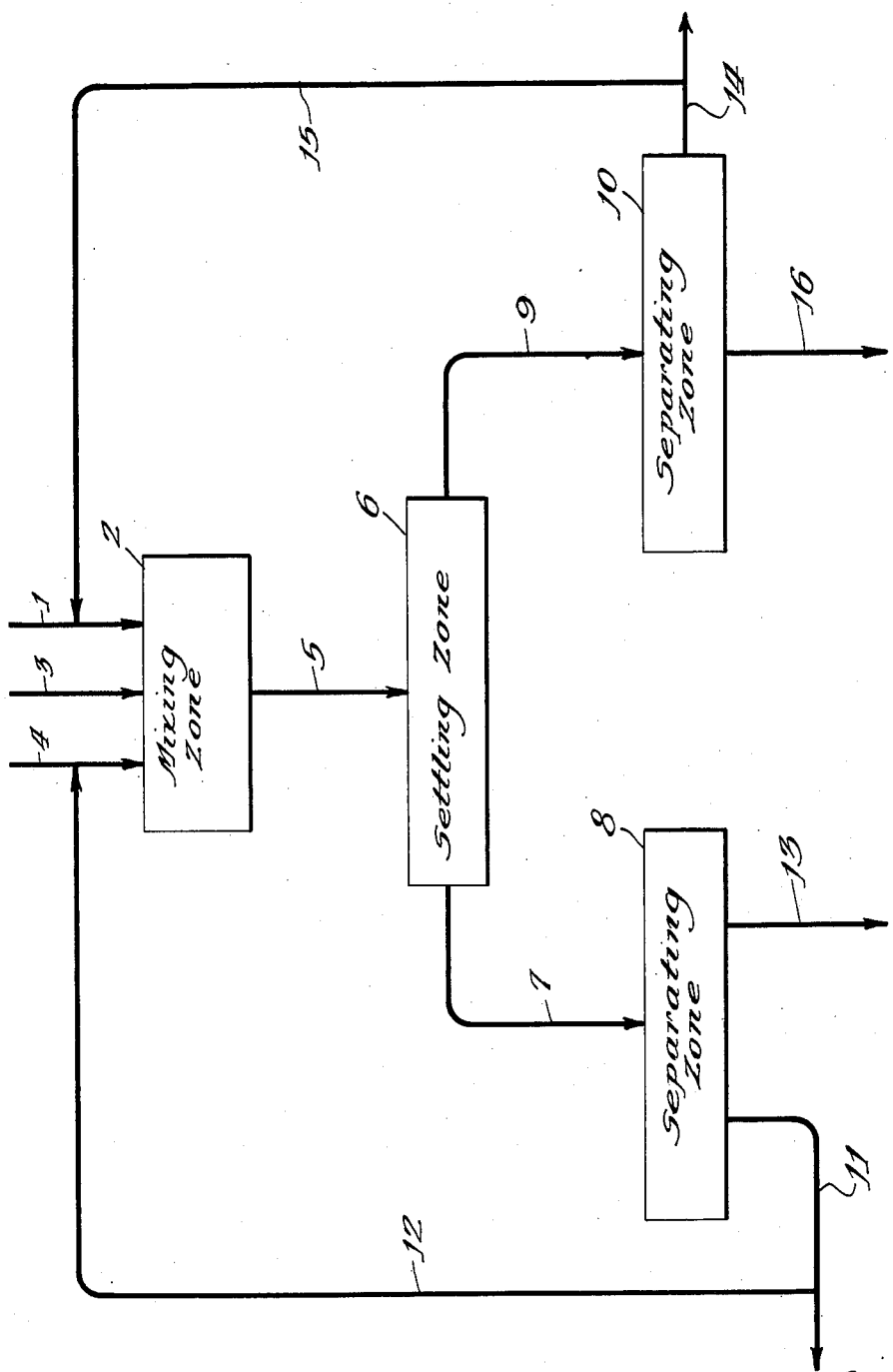

2,622,108

UNITED STATES PATENT OFFICE 2,622,108

PRODUCTION OF DRYING OILS

Herman S. Bloch, Chicago, and Richard C. Wackher, La Grange, Ill., assignors to Universal Oil Products Company, Chicago, Ill., a corporation of Delaware Application May 29, 1948, Serial No. 30,157

5 Claims. (Cl. 260—666)

This invention relates to a process for producing drying oils by converting mixtures of carbonylic compounds and olefinic hydrocarbons having at least 3 carbon atoms per molecule. More particularly, the invention is concerned with the production of a substantially saturated liquid hydrocarbon product and a higher boiling unsaturated liquid product by polymerization and hydrogen transfer reactions of a carbonylic compound and an olefinic hydrocarbon having at least 3 carbon atoms per molecule.

One of the objects of this invention is the manufacture of an unsaturated liquid product having more than one double bond per molecule.

A further object of this invention is the producton of a substantially paraffinic hydrocarbon product and of a higher boiling unsaturated liquid organic material useful as a drying oil.

One specific embodiment of this invention relates to a process for producing a drying oil which comprises reacting a carbonylic compound and an olefinic hydrocarbon having at least 3 carbon atoms per molecule in the presence of a conjunct polymerization catalyst until a reaction mixture comprising substantially saturated hydrocarbons and polyunsaturated organic compounds is formed, separating the reaction mixture into a hydrocarbon layer and a catalyst layer, separating substantially saturated hydrocarbons from the hydrocarbon layer, and recovering from the catalyst layer a drying oil having an average molecular weight greater than that of the olefinic charge stock.

Another embodiment of this invention relates to a process for producing a drying oil which comprises reacting a carbonylic compound and an olefinic hydrocarbon having at least 3 carbon atoms per molecule in the presence of a catalyst comprising a major proportion by weight of hydrogen fluoride until a reaction mixture comprising substantially saturated hydrocarbons and polyunsaturated organic compounds is formed, separating the reaction mixture into a hydrocarbon layer and a hydrofluoric acid layer containing polyunsaturated organic compounds, separating substantially saturated hydrocarbons from the hydrocarbon layer, and recovering from the hydrofluoric acid layer a drying oil having an average molecular weight greater than that of the olefinic charge stock.

A further embodiment of this invention relates to a process for producing a drying oil which comprises reacting a carbonylic compound and an olefinic hydrocarbon having at least 3 carbon atoms per molecule in the presence of a catalyst consisting essentially of hydrofluoric acid containing less than about 10% by weight of water until a reaction mixture comprising substantially saturated hydrocarbons and polyunsaturated compounds is formed, separating the reaction mixture into an acid phase and a hydrocarbon phase, separating substantially saturated hydrocarbon products from the hydrocarbon phase, and recovering from the acid phase a drying oil having an average molecular weight greater than that of the olefinic charge stock.

In still another embodiment of this invention, a carbonylic compound and a normally liquid monoolefin hydrocarbon are subjected to polymerization and hydrogen transfer reactions in the presence of a catalyst consisting essentially of hydrofluoric acid containng less than about 10% by weight of water at a reaction temperature and for a time sufficient to effect formation of a saturated hydrocarbon layer and a heavier lower layer comprising essentially hydrogen fluoride and a highly unsaturated organic material, the reaction mixture is separated into a hydrogen fluoride catalyst layer and a hydrocarbon layer, substantially saturated hydrocarbon products having more carbon atoms per molecule than the charged liquid monoolefin are separated from the hydrocarbon layer, and an unsaturated drying oil is recovered from the hydrogen fluoride layer.

Monoolefinic hydrocarbons utilizable in the process have at least 3 carbon atoms per molecule and comprise propylene, the butylenes, pentenes, hexenes, heptenes, octenes, and higher boiling monoolefinic hydrocarbons. A preferred source of such monoolefinic hydrocarbons is polymer gasoline which is formed, for example, by polymerizing propylene and butylenes or mixtures thereof in the presence of solid phosphoric acid catalyst which is a calcined composite of a phosphoric acid and a siliceous carrier such as diatomaceous earth, also called kieselguhr. Fractions of cracked gasoline containing substantial amounts of olefins and relatively small proportions of aromatic hydrocarbons are also suitable charging stocks. These gasoline charging stocks may also contain certain amounts of paraffinic and naphthenic hydrocarbons some of which may be alkylated during the polymerization treatment. $C_3$ and $C_4$ fractions recovered from the products of cracking and a $C_4$ fraction recovered from butane dehydrogenation and containing mainly butylenes and normal butane with relatively little isobutane are also good charging stocks for this process.

This invention relates to the conjunct co-polymerization of aliphatic olefinic hydrocarbons with certain polar compounds characterized by possession of one or more groups of the type

and otherwise lacking in unsaturation. Such compounds are capable of enolization, and although it is doubtful whether they actually enolize under the conditions of conjunct polymerization, they appear to undergo conjunct co-polymerization with the hydrocarbon olefins to form a polyenic product containing oxygen. Examples of such materials containing carbonyl groups are diacetone alcohol, triacetin, ethyl laurate, polyvinylacetate, the ethylene glycol ester of adipic acid, the polyamide of hexamethylene diamine and adipic acid, acetophenone, cyclopentanone, acetoacetic ester, diethylmalonate, phenylacetic acid, heptaldehyde, butyric acid amide, and the like; or, in general, saturated compounds containing aldehyde, ketone, carboxylic acid, ester, or amide groups. The carbonylic compounds used in this process may also contain carboxylic acid groups such as are present in pyruvic acid ($CH_3COCOOH$), in levulinic acid ($CH_3COCH_2CH_2COOH$), and in other polyfunctional compounds.

Hydrogen fluoride catalysts employed in the present process and also referred to as hydrofluoric acid catalysts contain a major proportion by weight of hydrogen fluoride and generally at least 90% by weight of hydrogen fluoride and as much as 10% by weight of water, although the titratable acidity of the catalyst layer may be less than 90% because of the presence therein of dissolved organic compounds including highly unsaturated polymer which is hereinafter described more completely. The preferred catalyst for this process is substantially anhydrous hydrogen fluoride, that is, 100% HF, or the commercial grade thereof, which contains 98+% HF.

Other conjunct polymerization catalysts utilizable in the production of drying oils from a sludge containing the same and produced under reaction conditions similar to those employed for the formation of a sludge from a hydrogen fluoride catalyst, include in general, certain acid-acting halides such as aluminum bromide and aluminum chloride, in their substantially anhydrous forms, sulfuric acid of at least about 85% concentration, boron trifluoride and mixtures of boron trifluoride and hydrogen fluoride. These other catalysts form conjunct polymerization products which are structurally and physically similar to the conjunct polymers formed when hydrogen fluoride is utilized as the catalyst herein, but differ chiefly in the manner of recovering the conjunct polymers from sludges containing said catalysts. Because hydrogen fluoride sludges may be decomposed under such conditions that the catalyst may be recovered in a substantially anhydrous condition, suitable for recycling to the sludge-forming stage, it is generally preferred in the present process.

The operating temperature employed in this process has a profound influence upon the nature of the reaction occurring when a carbonylic compound and an olefinic hydrocarbon are contacted with a conjunct polymerization catalyst, for example, with hydrofluoric acid of 90 to 100% concentration. Part of this effect of temperature may be due to the behavior of the olefins themselves in the presence of hydrogen fluoride.

Ethylene reacts with hydrogen fluoride to form ethyl fluoride and also certain amounts of polymers at temperatures from about 0° to about 175° C. Propylene also gives some isopropyl fluoride at the lower operating temperatures but conjunct polymer formation from propylene increases at the higher temperatures of treatment within the mentioned range of 0° to about 175° C.

In contrast with the behavior of ethylene which produces ethyl fluoride as the chief product, the monoolefins having at least 3 carbon atoms per molecule undergo extensive polymerization and condensation with carbonylic compounds particularly aldehydes and ketones in the presence of hydrogen fluoride with only a small amount of alkyl fluoride formation at temperatures of from about 0° to about 175° C. and preferably at temperatures of from about 10° to about 125° C. Also the condensation and polymerization of these olefins and carbonylic compounds involves more than the simple combination of olefinic molecules to form dimers, trimers, tetramers, and higher polymers.

It has been observed and these observations have been made the basis of the present process that when a mixture of olefinic hydrocarbons and carbonyl compounds is subjected to conjunct co-polymerization in the presence of a conjunct polymerization catalyst heretofore specified, conjunct polymer product is formed in significantly greater yield than in the case of the conjunct polymerization of the monoolefin only. The modified chemical structure of the product (by virtue of the presence of oxygen compounds) markedly affects the drying properties of the material, the modified polymer forming an air-dried film of excellent adherence which dries completely to a non-tacky, non-brittle film possessing the desired properties of such films for drying oil purposes. Further, the presence of carbonyl compounds such as diacetone alcohol, in the charging stock tends to increase the yeld of conjunct polymers obtained from a given weight of charge and conjunct polymerization catalyst. The latter effect is believed to be due to the increased number of hydrogen acceptors per unit weight of reactants charged to the process.

The complex series of reactions herein referred to in the aggregate as a "conjunct polymerization reaction" comprises an initial polymerization and condensation reaction between the olefinic and carbonylic components of the charging stock and as the reaction progresses further, cyclization and isomerization of the polymers and condensation products occur, accompanied by a hydrogen transfer reaction between the organic compounds or "conjunct polymers" present in the reaction mixture whereby a portion of the conjunct polymers are converted into saturated hydrocarbons by virtue of the hydrogen transfer at the expense of other components which are converted into hightly unsaturated organic compounds containing on an average of from about 2.5 to about 4 double bonds per molecule of which from about 40 to about 70% are conjugated. The resulting unsaturated conjunct polymers comprising a series of high molecular weight polyolefinic cyclic compounds become attached by weak chemical bonds to the catalyst to form a sludge-like complex addition product in which the fluorine (in the case of a hydrogen fluoride catalyst) is not, however, organically bound, since it can be substantially all recovered by treatment of the complex with water or aqueous alkali. The saturated hydrocarbon conjunct polymers form an insoluble phase which upon settling of the reaction mixture separates as a distinct upper layer hereinabove referred to. Since the formation of the unsaturated conjunct polymer is dependent upon the presence of hydrogen acceptors in the reaction mixture, it also follows that the proportion of hydrogen acceptors to hydrogen donors influences the total unsaturation of the polyolefinic conjunct polymers formed, as well as their yield from given weights of hydrocarbons and carbonyl compounds charged. The knowledge of the relationship between unsaturation of the hydrocarbon charging stock and the unsaturation of the ultimate hydrocarbon drying oil product is embodied in the utilization of an admixture of carbonyl compounds and monoolefins as charging stock in the present process to obtain conjunct co-polymerization therebetween and to form a greater yield of conjunct polymers having somewhat different chemical structure than a product similarly prepared by conjunct polymerization of a monoolefin only. The oxygen-modified structures of the conjunct polymers obtained in accordance with the process herein provided are believed to be the basic factors involved in the formation of the more adherent, more elastic, and tougher film, on oxidation of the drying oil when exposed to atmospheric oxygen.

Study of the ultra-violet and infra-red absorption spectra and other properties of drying oil fractions formed from polymer gasoline and boiling from about 150° to about 200° C., shows that many of these drying oil hydrocarbons contain a pair of conjugated double bonds with one of these double bonds in a ring of 5 carbon atoms and the other double bond in an alkenyl side chain. Thus a cyclopentene ring may be combined with a methylene group or a vinyl group. However, some of the drying oil hydrocarbons may also contain a cyclopentadiene ring. The drying oil hydrocarbons which contain a cyclopentenyl ring also contain more than two substituent groups but each of these groups is highly substituted. The higher boiling fractions of this drying oil boiling up to about 450° C. contain polycyclic hydrocarbons which are generally bicyclic. In both the monocyclic and polycyclic hydrocarbons the five-carbon atom ring portions of the molecules are combined with at least two alkyl groups or two unsaturated aliphatic groups. The data obtained on these fractions indicate that one of the double bonds comprised by the conjugated diene systems of the drying oil is within a five-carbon atom ring and the other double bond is in an alkenyl or alkapolyenyl substituent. Alkapolyenyl groups that may be present are highly branched and contain isolated unsaturation as well as conjugated unsaturation. Some of the typical hydrocarbons contained in the drying oil mixtures so produced from polymer gasoline are represented structurally by the following formula:

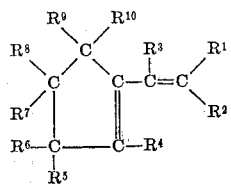

wherein the radicals $R^1$ to $R^{10}$ are selected from the group consisting of hydrogen and alkyl, alkenyl and alkapolyenyl hydrocarbon radicals, at least two of the substituents $R^4$ to $R^{10}$ are hydrocarbon radicals, and not more than two of the groups $R^1$ to $R^4$ represent hydrogen.

Other constituents of the drying oil formed from polymer gasoline are believed to have structures that may be represented by the formula:

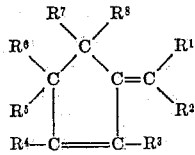

wherein $R^1$ to $R^8$ represent members of the group consisting of hydrogen and alkyl, alkenyl, and alkapolyenyl hydrocarbon radicals, at least two of the substituents $R^3$ to $R^8$ are hydrocarbon radicals, and not more than two of the substituents $R^1$ to $R^4$ are hydrogen.

The drying oils of the present process contain organic compounds having some of the aforementioned five-carbon atom ring structures condensed with a carbonylic compound.

The condensation products which are formed from the olefinic hydrocarbons and carbonyl compounds are of higher molecular weight than the olefinic hydrocarbon charging stock and have good drying oil properties. Such drying oils which may be regarded as mixtures of condensation products, and high boiling conjunct polymers have a high degree of conjugated and non-conjugated unsaturation. These drying oils have the advantage that they form protective films that are less brittle, more adherent, and more durable than those formed from high boiling unsaturated oils produced similarly from monoolefin hydrocarbons without the addition of carbonylic compounds.

This condensation or co-polymerization process for producing drying oils may be modified further by incorporating in the reaction mixture a certain amount of a more unsaturated olefinic hydrocarbon, namely, a dienic hydrocarbon such as, for example, butadiene-1,3, isoprene, cyclopentadiene, and the like; or an acetylenic hydrocarbon.

The process consists essentially of contacting a mixture of an olefinic hydrocarbon and a carbonylic compound with substantially anhydrous hydrogen fluoride at conjunct polymerization conditions, separating the upper saturated hydrocarbon layer from the lower catalyst sludge layer, and then decomposing the sludge by water hydrolysis, by heating, or by other suitable means to recover the drying oil therefrom. Improvement in adhesive properties of the drying oil product is observed when about 2 mole per cent of the carbonyl compound is present. When more than about an equal molecular proportion of carbonyl compound is present, the amount of condensation and speed of the condensation process are retarded. Accordingly, the molar ratio of olefin to carbonylic compound will depend upon the properties desired in the product but may vary from about 1 to about 50. The weight ratio of hydrogen fluoride catalyst to organic charging stock, that is, the combined mixture of carbonylic compounds and olefinic hydrocarbon, may vary from about 0.1 to about 10. When the hydrogen fluoride to organic compound weight ratio is less than about 0.1, it is necessary to recycle excessive amounts of organic compounds in order to obtain good conversion while increases in this ratio above about 10 effect very little further increase in yield of the desired reaction products but such increased ratio of hydrogen fluoride to organic reactants does decrease the capacity of the reaction and other treating equipment.

The present process is carried out at a temperature of from about 0° to about 175° C. and at a pressure sufficient to maintain the reactants and catalyst in substantially liquid phase. The operating pressure is generally from about 1 to about 100 atmospheres. At these reaction conditions, a vigorously agitated mixture of hydrogen fluoride, carbonylic compound and olefinic hydrocarbon containing at least 3 carbon atoms per molecule yields a high proportion of catalyst layer containing polyunsaturated organic compounds during a time of from about 1 to about 30 minutes, but the reaction may be continued for a longer time to obtain a better yield of the polyunsaturated organic compounds and a more highly saturated hydrocarbon mixture which is separated as an upper layer from the hydrogen fluoride layer.

Olefinic hydrocarbons having more than 3 carbon atoms per molecule are more desirable as charging stocks than propylene because of the increased yields of both saturated and unsaturated liquid products and improved properties of the products obtained from these preferred charging stocks. About the same quantity and quality of drying oil are obtained when charging any of the olefins having from 4 to about 12 carbon atoms per molecule. The different monoolefins having at least 4 carbon atoms per molecule appear to be mutually interconvertible by polymerization and depolymerization reactions at the conditions specified for this purpose.

It is of particular interest to note that in this type of co-polymerization, in which hydrogen transfer occurs, the product recovered from the sludge or catalyst layer has a higher molecular weight than the charge stock, and is generally more unsaturated than the charge stock.

It should be noted further that the introduction of polar groups into the polyenic conjunct polymer permits further modification of this product. For example, if an alcohol group is introduced into the molecule by conjunct polymerization, the product may be esterified subsequently with either monobasic or polybasic acids (which may, in turn, be saturated or unsaturated) to make a wide variety of esters and polyesters having a wide range of properties, or if acidic groups are introduced into the molecule by conjunct polymerization, the product may be esterified subsequently with either monohydric or polyhydric alcohols, or be reacted with amines, of either saturated or unsaturated type, to make a large variety of esters and amides having a wide range of properties.

In carrying out this process, a carbonylic compound, an olefinic hydrocarbon having at least 3 carbon atoms per molecule, and liquid hydrogen fluoride are added to a reactor provided with adequate means for agitating the reactor contents and for controlling the temperature therein. Since the polymerization and co-polymerization reactions of this process are exothermic, it is generally necessary to cool the reactor in order to maintain a chosen reaction temperature. The carbonylic compound, olefin hydrocarbon, and hydrogen fluoride catalyst are generally mixed at such rates that substantially complete conversion of all of the organic compounds charged is effected. After the desired quantity of organic material, comprising essentially olefinic hydrocarbons and carbonylic compounds, has been added to the hydrofluoric acid, or after the hydrofluoric acid has been added to the organic material, the agitation or stirring of the reaction mixture is generally continued for a time sufficient to ensure substantially complete conversion of the reactants into saturated hydrocarbons and also highly unsaturated organic liquids having drying oil properties. The agitation or mixing is then stopped and the reaction mixture is permitted to stand whereby it forms two layers: an upper substantially saturated hydrocarbon layer and a lower hydrogen fluoride layer. The substantially saturated hydrocarbon layer is separated from the lower hydrogen fluoride layer comprising essentially hydrogen fluoride and highly unsaturated organic material with drying oil properties.

As the saturated hydrocarbons of the upper layer boil over about the same range of temperature as do the unsaturated drying oil constituents recoverable from the hydrogen fluoride lower layer and as small amounts of the saturated hydrocarbons are entrained or mixed with the hydrogen fluoride lower layer, it is advisable to extract the hydrogen fluoride lower layer with a low boiling saturated hydrocarbon, preferably a paraffin having from 3 to about 8 carbon atoms per molecule, before hydrolyzing, or otherwise decomposing, the hydrogen fluoride lower layer to recover the unsaturated drying oil therefrom. From the lower layer, the hydrogen fluoride and drying oil fractions are then separated by suitable means, for example, the lower layer may be added to water or ice whereby the hydrogen fluoride is dissolved in water to form an aqueous solution from which the drying oil separates as an upper layer. Also the lower layer may be subjected to flash distillation to vaporize the hydrogen fluoride from the higher boiling highly unsaturated drying oil. When the lower layer is separated by distillation methods, the recovered hydrogen fluoride is suitable for recycling to the process to effect reaction of additional quantities of the charged monoolefinic hydrocarbon and carbonylic compound.

The passage of inert gas, such as nitrogen, hydrogen, methane, ethane, carbon dioxide, and the like through the distillation system in which the hydrogen fluoride is being separated, assists in the recovery of the highly unsaturated drying oil. Separation of hydrogen fluoride from the drying oil present in the lower layer is also assisted by carrying out the distillation of said lower layer in a tower containing catalytic packing material formed from graphitized carbon or from a metal selected from the members of the group consisting of aluminum, copper, cobalt, lead, cadmium, and an alloy of copper, such as brass, and preferably in the presence of an inert carrier gas to assist in removing the liberated hydrogen fluoride.

Another method of decomposing the hydrogen fluoride-drying oil mixture of the lower layer formed by the reaction of hydrogen fluoride with a mixture of olefins and carbonylic compounds, is to introduce the lower layer or sludge into an inert liquid such as a paraffinic hydrocarbon, contained in a decomposition zone and maintained at a temperature near its boiling point. The decomposition zone or reactor tower may contain a catalytic packing material in the liquid zone of this reactor tower and an inert gas may also be passed therethrough. Hydrogen fluoride so liberated is vaporized, condensed, and conducted to storage while the inert liquid containing the dissolved, highly unsaturated drying oil is withdrawn from the decomposition zone, either intermittently or continuously, and replaced by fresh liquid. This liquid should be readily separable from the drying oil dissolved therein and it should also be relatively inert to the hydrogen fluoride sludge and to the products of the decomposition of the sludge. If a paraffinic naphtha is employed, its normal boiling point should be from about 100° to about 150° C. so that it may be separated by fractional distillation from the drying oil which boils generally from about 150° to about 450° C.

One method of carrying out the process of this invention is illustrated diagrammatically by Figure 1 which is a flow diagram indicating the various steps of the process. According to the method illustrated, an olefin-containing feed stock, such as a butane-butylene or pentane-pentene mixture, is directed through line 1 to mixing zone 2 to which a carbonylic compound such as diacetone alcohol is directed through line 3 and hydrofluoric acid of 90 to 100% hydrogen fluoride concentration is introduced through line 4. Mixing zone 2 comprises a coil, an agitated reaction zone, or other mixing equipment, preferably provided with suitable temperature control means, such as, for example, a cooling or heating jacket or a cooling or heating coil in order to maintain the reaction mixture at a chosen temperature within the limits of from about 0° to about 175° C. The reaction mixture present in mixing zone 2 may also contain recovered hydrogen fluoride and a low boiling saturated hydrocarbon which are separated from the final reaction products and recycled through lines 12 and 15 respectively to lines 4 and 1 hereinafter described. The olefin-containing feed stock, carbonylic compound and hydrogen fluoride are contacted in mixing zone 2 for a time sufficient to convert substantially all the olefin monomer and carbonylic compound into polymers and condensation products, and also to effect a hydrogen transfer reaction between the various polymers and condensation products so as to produce a substantially saturated hydrocarbon product and a highly unsaturated product, the latter being associated with the liquid hydrogen fluoride catalyst. From mixing zone 2, the resultant mixture is directed through line 5 to settling zone 6 wherein the mixture or emulsion of organic compounds and liquid hydrofluoric acid is permitted to stand and to separate into an upper hydrocarbon layer and a lower hydrofluoric acid catalyst layer. From settling zone 6, the hydrofluoric acid catalyst layer is withdrawn through line 7 to catalyst layer separating zone 8 while a substantially saturated hydrocarbon material which separates as an upper layer in zone 6 is directed therefrom through line 9 to hydrocarbon layer separating zone 10.

The hydrogen fluoride catalyst layer in separating zone 8 is subjected to flash distillation to separate hydrogen fluoride from highly unsaturated organic material, comprising drying oil materials. The used hydrogen fluoride so separated in zone 8 is directed therefrom through line 11 and at least a portion thereof is directed through recycle line 12 to line 4, and thence to mixing zone 2 already mentioned, while the highly unsaturated liquid drying oil material is discharged from separating zone 8 through line 13 to storage or to further purification or fractionation not illustrated in Figure 1.

The hydrocarbon layer so separated from used hydrogen fluoride catalyst in settling zone 6 is subjected to suitable fractionation in hydrocarbon separating zone 10. Fractional distillation of the hydrocarbonaceous material present in zone 10 separates therefrom as an overhead fraction, a mixture of residual dissolved hydrogen fluoride and substantially saturated low boiling hydrocarbons introduced to the process in the olefin-containing charging stock. Thus when charging a butane-butylene fraction, the hydrocarbon stream being directed from separating zone 10 through line 14 is mainly normal butane while this stream is mainly normal pentane when a pentane-pentene mixture is charged to mixing zone 2. If desired, a portion of the low boiling saturated hydrocarbon fraction which is discharged through line 14 may be directed therefrom through recycle line 15 to line 1 already mentioned through which the olefin-containing feed stock is directed to the process. After the removal of the low boiling saturated hydrocarbons in hydrocarbon separating zone 10, a substantially saturated hydrocarbon product formed by the condensation, polymerization, and hydrogen transfer reactions is directed from zone 10 through line 16 to storage or to use not illustrated in the diagrammatic drawing.

When the olefinic charging stock does not contain a substantial proportion of saturated hydrocarbons having from 3 to about 8 carbon atoms per molecule, it is advisable to extract the hydrofluoric acid layer with such a solvent before separating the drying oil from the hydrofluoric acid layer in separating zone 8.

The following examples are given to illustrate the process of this invention although the data introduced should not be misconstrued to limit unduly the broad scope of the invention.

EXAMPLE I

Polymer gasoline and diacetone alcohol were treated with hydrogen fluoride to produce a drying oil. The polymer gasoline, which boiled between 28° and 225° C. had a specific gravity, $d_4^{20}$, of 0.712, a Reid vapor pressure of 12.7 pounds per square inch, a bromine number of 132, a molecular weight of 105 and a sulfur content of 0.04% by weight. In carrying out this process, 185 grams of polymer gasoline and 26 grams of diacetone alcohol were charged to a turbomixer autoclave of 1,000 cc. capacity, the free space was flushed with nitrogen and then 196 grams of anhydrous hydrogen fluoride was added to the mixture of polymer and diacetone alcohol. The resultant reaction mixture was stirred for one hour at a temperature of 90–95° C. and at a maximum pressure of 132 pounds per square inch. The resultant reaction mixture was then permitted to stand in a settler at 4–10° C. and separated into 104 grams of an upper layer and 299 grams of a lower hydrofluoric acid layer. The upper layer after washing with water, sodium bicarbonate solution, and again with water, weighed 99.5 grams. The lower hydrofluoric acid layer was hydrolyzed with water, and then washed with water to remove hydrogen fluoride. The organic liquid obtained from the hydrolysis weighed 91 grams.

In this treatment of a mixture of polymer gasoline and diacetone alcohol with anhydrous hydrogen fluoride, a typical conjunct polymerization occurred in which a saturated hydrocarbon layer and a lower hydrofluoric acid layer containing highly unsaturated compounds was obtained. Carbon and hydrogen analysis of the organic liquid obtained by hydrolyzing the hydrofluoric acid layer showed the presence of about 1.8% oxygen which represents 23% of the oxygen charged in the diacetone alcohol. The 23% represents only a minimum value of the percentage of the charged diacetone alcohol appearing in the lower layer product, since some of the oxygen may have been lost in dehydration reactions. The larger yield of unsaturated product, namely 91 grams, over a normal yield of 70 grams of drying oil product obtained from polymer gasoline alone shows that more than 23% of the diacetone alcohol appeared to undergo conversion.

Drying tests on the resultant drying oil recovered from the hydrogen fluoride layer and having a molecular weight of 254, showed that it dried hard in 2 to 3 days either in the presence or absence of driers such as naphthenates of cobalt, manganese and lead. The dried film of the drying oil had a maximum Sward hardness of 16.

Other properties of the upper layer and lower layer hydrocarbons obtained by this reaction of polymer gasoline with diacetone alcohol in the presence of liquid hydrogen fluoride are given in the following table:

TABLE 1

*Properties of reaction products from diacetone alcohol and polymer gasoline*

UPPER LAYER

| | |
|---|---|
| Bromine number | 2 |
| $n_D^{20}$ | 1.4172 |
| Spec. disp | 101 |
| $d_4^{20}$ | 0.7396 |

LOWER LAYER PRODUCT

| | |
|---|---|
| Bromine number | 174 |
| Maleic anhydride value | 78 |
| Mol. wt | 254 |
| $d_4^{20}$ | 0.8658 |
| Color (Gardner) | 16 |
| Viscosity (poises at 25° C.) | below 5 |
| $n_D^{20}$ | 1.4849 |
| Spec. disp | 139 |
| Carbon, percent | 86.16 |
| Hydrogen, percent | 12.00 |

DRYING TEST

| | With drier | Without drier |
|---|---|---|
| Dry (dust free) days | Below 1 | 3 |
| Max. Sward hardness | 16 | 16 |
| Dried hard, days | 2 | 3 |

DISTILLATIONS—UPPER LAYER

| ml. | gms. | Wt. Percent | °C. |
|---|---|---|---|
| I. B. P.–3.5 | 6.0 | 12.7 | Below 28 |
| 3.5–11.5 | 1.7 | 3.6 | 28– 50 |
| 11.5–21.5 | 5.4 | 11.5 | 50–125 |
| 21.5–29.5 | 6.9 | 14.7 | 125–175 |
| 29.5–42.5 | 5.8 | 12.3 | 175–225 |
| Botts | 9.9 | 21.0 | 225–295 |
| | 11.4 | 24.2 | above 295 |

LOWER LAYER

| ml. | gms. | Wt. Percent | °C. |
|---|---|---|---|
| I. B. P.–1.5 | 3.0 | 7.0 | 41–171 |
| 1.5–6.5 | 3.5 | 8.2 | 171–222 |
| 6.5–13.5 | 5.6 | 13.1 | 222–276 |
| 13.5–22.5 | 8.1 | 19.0 | 276–325 |
| Botts | 22.4 | 52.7 | above 325 |

EXAMPLE II

Following the procedure used in Example I, 185 grams of the mentioned polymer gasoline, 52 grams of triacetin, (CH₃COOCH₂CH(OCOCH₃)CH₂OCOCH₃)

and 193 grams of anhydrous hydrogen fluoride were stirred for one hour at a temperature of 90°–95° C. and at a maximum gage pressure of 98 pounds per square inch. The resultant liquid reaction mixture was then separated into 112 grams of upper layer and 313 grams of lower layer.

Conjunct polymerization occurred in this run, as evidenced by the fact that the upper layer consisted of substantially saturated hydrocarbons. The upper layer and pentane extract of the lower layer after washing with water and drying weighed 114 grams. The lower layer after hydrolysis and water washing of the organic material yielded 74 grams of organic liquid. The carbon and hydrogen analysis of the lower layer product showed the presence of about 1.8% oxygen thus evidencing co-polymerization or condensation of the polymer gasoline and triacetin. About half of the drying oil material (lower layer product) boiled higher than 325° C. Drying tests on the entire lower layer product in the presence of driers showed that this material dried in 8 days to a non-brittle film with a Sward hardness of 15.

Further properties of the upper layer hydrocarbons and lower layer drying oil are given in Table 2.

TABLE 2

*Properties of reaction products from triacetin and polymer gasoline*

UPPER LAYER

| | |
|---|---|
| Bromine number | 6 |
| $n_D^{20}$ | 1.4248 |
| Spec. disp | 102 |
| $d_4^{20}$ | 0.7599 |

LOWER LAYER PRODUCT

| | |
|---|---|
| Bromine number | 190 |
| Maleic anhydride value | 72 |
| Mol. wt | 241 |
| $d_4^{20}$ | 0.8569 |
| Color (Gardner) | 16 |
| Viscosity (poises at 25° C.) | 0.3 |
| Carbon, percent | 85.76 |
| Hydrogen, percent | 12.40 |

DRYING TEST (WITH DRIER)

| | |
|---|---|
| Dust free in, days | 5 |
| Dried hard in, days | 8 |
| Sward hardness | 15 |

DISTILLATIONS—UPPER LAYER

| ml. | gms. | Weight Percent | °C. |
|---|---|---|---|
| I. B. P.–4 | 2.5 | 6.5 | Below 28 |
| 4–22 | 13.0 | 33.9 | 28–225 |
| 22–30 | 6.0 | 15.6 | 225–275 |
| 30–35 | 4.6 | 12.0 | 275–325 |
| Botts | 12.3 | 32.0 | Above 325 |

LOWER LAYER

| ml. | gms. | Weight Percent | °C. |
|---|---|---|---|
| I. B. P.–3 | 1.7 | 5.0 | Below 27 |
| 3–12 | 7.7 | 22.8 | 27–275 |
| 12–20 | 7.6 | 22.6 | 275–325 |
| Botts | 16.7 | 49.6 | Above 325 |

We claim as our invention:

1. A process for producing a drying oil which comprises mixing from about 0.1 to about 10 parts by weight of hydrofluoric acid of from about 90 to about 100% hydrogen fluoride concentration and one part by weight of a mixture of one molar proportion of a carbonyl compound and from 1 to 50 molar proportions of a monoolefinic hydrocarbon having at least 3 carbon atoms per molecule at a temperature of from about 0° to about 175° C., said carbonyl compound being a saturated compound containing a radical of the class consisting of aldehyde, ketone, carboxylic acid, ester and amide groups, agitating the reaction mixture for a time sufficient to form polymerization and condensation products and to effect hydrogen exchange to form a polyunsaturated drying oil and a saturated hydrocarbon material, separating the reaction mixture into a hydrocarbon layer and a hydrofluoric acid layer, recovering a drying oil from the hydrofluoric acid layer, and recovering a saturated hydrocarbon product from the hydrocarbon layer.

2. A process for producing a drying oil which comprises mixing from about 0.1 to about 10 parts by weight of hydrofluoric acid of from about 90 to about 100% hydrogen fluoride concentration and one part by weight of a mixture of one molar proportion of a carbonyl compound and from 1 to 50 molar proportions of propylene at a temperature of from about 0° to about 175° C., said carbonyl compound being a saturated compound containing a radical of the class consisting of aldehyde, ketone, carboxylic acid, ester and amide groups, agitating the reaction mixture for a time sufficient to form polymerization and condensation products and to effect hydrogen exchange to form a polyunsaturated drying oil and a saturated hydrocarbon material, separating the reaction mixture into a hydrocarbon layer and a hydrofluoric acid layer, recovering a drying oil from the hydrofluoric acid layer, and recovering a saturated hydrocarbon product from the hydrocarbon layer.

3. A process for producing a drying oil which comprises mixing from about 0.1 to about 10 parts by weight of hydrofluoric acid of from about 90 to about 100% hydrogen fluoride concentration and one part by weight of a mixture of one molar proportion of a carbonyl compound and from 1 to 50 molar proportions of butylene at a temperature of from about 0° to about 175° C., said carbonyl compound being a saturated compound containing a radical of the class consisting of aldehyde, ketone, carboxylic acid, ester and amide groups, agitating the reaction mixture for a time sufficient to form polymerization and condensation products and to effect hydrogen exchange to form a polyunsaturated drying oil and a saturated hydrocarbon material, separating the reaction mixture into a hydrocarbon layer and a hydrofluoric acid layer, recovering a drying oil from the hydrofluoric acid layer, and recovering a saturated hydrocarbon product from the hydrocarbon layer.

4. A process for producing a drying oil which comprises mixing from about 0.1 to about 10 parts by weight of hydrofluoric acid of from about 90 to about 100% hydrogen fluoride concentration and one part by weight of a mixture of one molar proportion of a carbonyl compound and from 1 to 50 molar proportions of a normally liquid mono-olefin at a temperature of from about 0° to about 175° C., said carbonyl compound being a saturated compound containing a radical of the class consisting of aldehyde, ketone, carboxylic acid, ester and amide groups, agitating the reaction mixture for a time sufficient to form polymerization and condensation products and to effect hydrogen exchange to form a polyunsaturated drying oil and a saturated hydrocarbon material, separating the reaction mixture into a hydrocarbon layer and a hydrofluoric acid layer, recovering a drying oil from the hydrofluoric acid layer, and recovering a saturated hydrocarbon product from the hydrocarbon layer.

5. A process for producing a drying oil which comprises mixing from about 0.1 to about 10 parts by weight of hydrofluoric acid of from about 90 to about 100% hydrogen fluoride concentration and one part by weight of a mixture of one molar proportion of a carbonyl compound and from 1 to 50 molar proportions of polymer gasoline at a temperature of from about 0° to about 175° C., said carbonyl compound being a saturated compound containing a radical of the class consisting of aldehyde, ketone, carboxylic acid, ester and amide groups, agitating the reaction mixture for a time sufficient to form polymerization and condensation products and to effect hydrogen exchange to form a polyunsaturated drying oil and a saturated hydrocarbon material, separating the reaction mixture into a hydrocarbon layer and a hydrofluoric acid layer, recovering a drying oil from the hydrofluoric acid layer, and recovering a saturated hydrocarbon product from the hydrocarbon layer.

HERMAN S. BLOCH.
RICHARD C. WACKHER.

REFERENCES CITED

The following references are of record in the file of this patent:

UNITED STATES PATENTS

| Number | Name | Date |
|---|---|---|
| 2,252,333 | Rothrock | Aug. 12, 1941 |
| 2,253,323 | Christman | Aug. 19, 1941 |
| 2,400,521 | Kuhn | May 21, 1946 |
| 2,440,459 | Bloch | Apr. 27, 1948 |
| 2,440,477 | Johnstone | Apr. 27, 1948 |